Jan. 26, 1965 P. WILSON 3,167,317

CARRYING ARMS FOR SOUND REPRODUCTION PICK-UPS

Filed Dec. 12, 1960

Percy Wilson
Inventor

By Blum, Moscovitz, Friedman & Blum
Attorneys

United States Patent Office 3,167,317
Patented Jan. 26, 1965

3,167,317
CARRYING ARMS FOR SOUND REPRODUCTION PICK-UPS

Percy Wilson, 56 Staunton Road, Headington, Oxford, England

Filed Dec. 12, 1960, Ser. No. 75,245
Claims priority, application Great Britain, Dec. 15, 1959, 42,569/59
2 Claims. (Cl. 274—23)

This invention relates to carrying arms for sound reproduction pick-ups, the arm being adapted to carry a phonograph pick-up at or adjacent one end, and the other end being provided with means for mounting the arm on a supporting member so that, in use, the pick-up may be moved about an axis parallel to the record playing surface (horizontal axis) and an axis at right angles to the record playing surface (vertical axis).

It is well known in the art that, with present day records and pick-ups, the quality of reproduction can be improved and the wear of the record surface and the pick-up stylus can be reduced, if the minimum playing weight, required to act at the pick-up to maintain close contact at all times between the stylus and the record groove, can be reduced to a relatively low value, say less than 2 grams.

In order to secure such a low value of minimum playing weight, the stylus compliance must be of the order of at least $10^{-5}$ cm./dyne and the effective mass of the moving elements of the cartridge, as seen from the stylus, must not exceed 1 or 2 milligrams.

Furthermore, even under these conditions, it is necessary to ensure that the bearing friction inhibiting pivoting of the arm about its horizontal and vertical pivotal axes is kept to a small value and that the arm is well isolated from vibrations from external sources, such as the adjacent turntable motor and movements of people within the room in which the apparatus is used.

It is also well known that, since the friction of the record groove upon the stylus is at an angle to the line joining the stylus to the vertical bearing of the pickup arm, a resultant force is set up which tends to push the stylus against the inner wall of the groove; and that this side pressure, as it is now commonly called, has the effect of creating distortion, and may even cause the stylus to ride up the inner wall from time to time and therefore come out of contact with the outer wall. In the case of stereo discs this may be specially obnoxious, since one stereo channel is recorded on the inner wall and the other on the outer wall.

To counteract these effects it has been proposed by the inventor in the past to neutralize the side pressure either by tilting the turntable so that the pickup has a gravitational bias away from the centre of the disc, or by introducing a spring in the vertical bearing of the pickup arm so as to give the arm a bias outwards.

The present invention proposes to solve the problem in a novel manner by arranging for the longitudinal pull along the arm, which is produced by the friction of the groove on the stylus, to tilt a balance member in the arm, thereby automatically causing an opposing force to come into play which will balance that pull and thereby neutralise the frictional force. This result can be secured by mounting the arm at the end remote from the pickup on horizontal bearings on the balance member, which itself is symmetrically balanced on a vertical universal pivot about which it can tilt in any direction. If the horizontal bearings and the universal pivot are in the same horizontal plane, a force transmitted along the arm, or a torque twisting the arm, could only tilt the balance member in the plane of the pivot and the horizontal bearings, and any such tilt would at the same time have the effect of twisting the stylus so that it would no longer rest vertically in the groove. If the horizontal bearings were above the universal pivot, tilting in all directions would be possible but any such tilt would be accompanied by a gravitational instability of the system on the universal pivot.

It is therefore proposed to have the horizontal bearings below the universal pivot so that the masses of both arm and balance member lead to gravitational stability. In these circumstances, any pull or push along the arm, such as that created by the frictional force at the stylus, will tend to move the stylus along the groove, thereby tilting the balance member on the universal pivot until a torque is created by such tilt sufficient to balance the pull or push along the arm. Since the tilt on the universal pivot can be in any direction, an accurate balance will automatically be secured by the mere placing of the stylus on the revolving disc, and the stylus will remain poised symmetrically in the groove free to respond impartially to the vibrations imparted by the groove modulations.

The present invention consists in a pick-up arm in which a balance member is incorporated between the arm and its mounting to the board, which balance member will be automatically influenced by the operation of the friction between stylus and groove in such a manner as to neutralise that frictional force, without causing the stylus to tilt from a symmetrical position in the groove, and without introducing side pressure on either wall of the groove.

The present invention consists in a pick-up arm in which the arm, at or adjacent its end remote from that carrying or adapted to carry the pick-up, is connected to a balance member for pivotal movement about an axis disposed generally horizontally in use, which balance member is supported by means of a universal pivot upon a post mountable in an upstanding position on a supporting surface, the arrangement being such that, in use, the center of gravity of the balance member and the said horizontal axis both lie below the horizontal plane containing the universal pivot.

The invention further consists in a pick-up arm in which the arm, at or adjacent its end remote from that carrying or adapted to carry the pick-up, is supported by means of a universal pivot upon a post mountable in an upstanding position on a supporting surface by means of a sleeve closed at one end and in which the post is fitted, the post being supported in the sleeve by hydraulic or pneumatic means, or both.

The invention still further consists in a pick-up arm in which the arm, at or adjacent its end remote from that carrying or adapted to carry the pick-up, is connected to a balance member for pivotal movements about an axis disposed generally horizontally in use, which balance member is supported by means of a universal pivot upon a post mountable in an upstanding position upon a supporting surface by means of a sleeve closed at one end and in which the post is fitted, the post being supported in the sleeve by hydraulic or pneumatic means, or both, and the arrangement being such that, in use, the center of gravity of the balance member and the said horizontal axis both lie below the horizontal plane containing the universal pivot.

Figures 1, 2, 3:
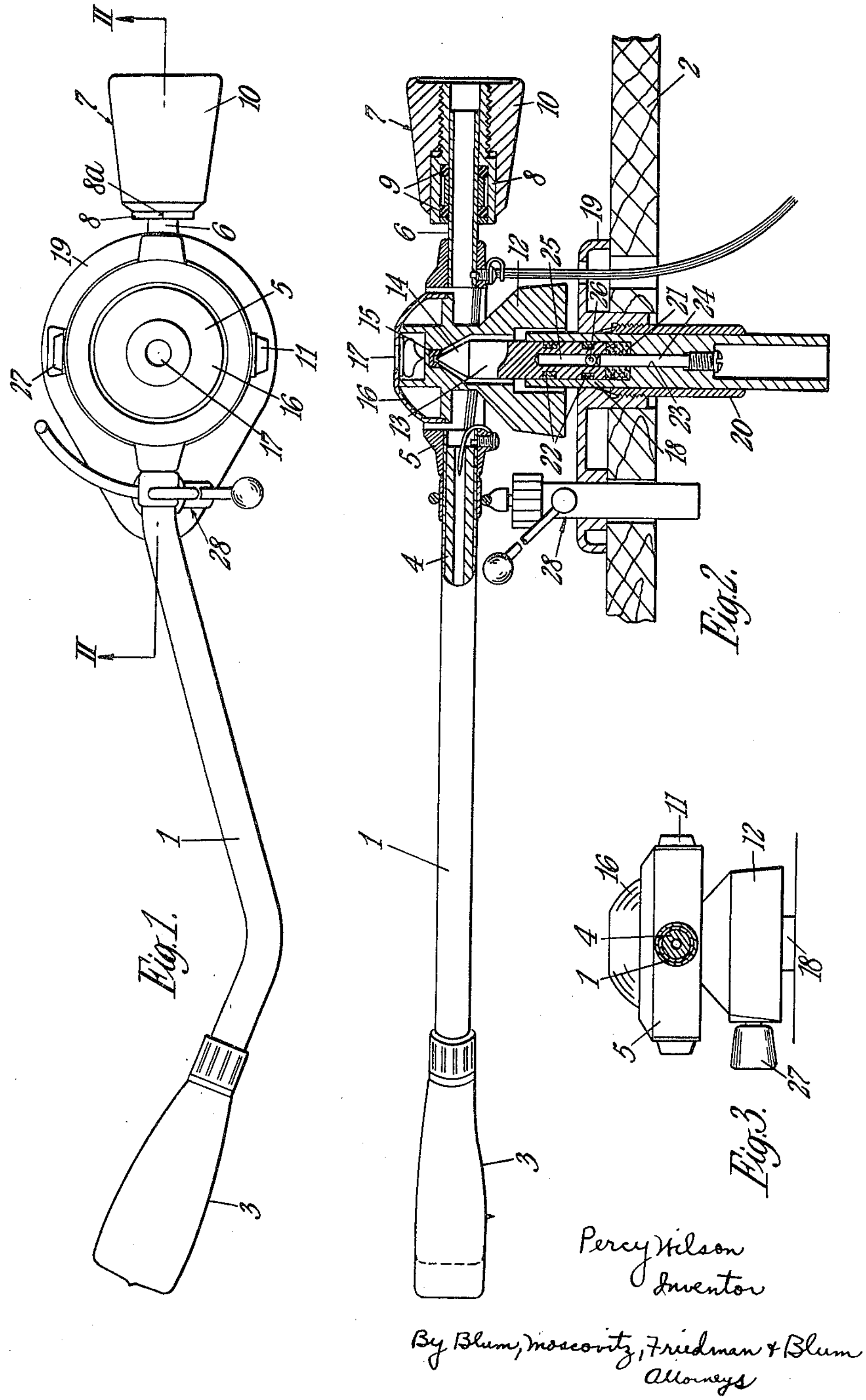
FIGURE 1 is a plan view of a pick-up arm according to the present invention.
FIGURE 2 is a view partly in vertical section on the lines II—II, of the arm shown in FIGURE 1.
FIGURE 3 is an end view from the left hand side of FIGURE 1, with a portion of the arm cut away for clarity.

In carrying the invention into effect according to one convenient mode by way of example, a carrying arm for a sound reproduction pick-up consists of an arm 1 adapted to carry a gramophone pick-up at one end, the other end being provided with means for mounting the arm on a supporting member 2, so that in use the pick-up may be moved about vertical and horizontal axes.

The pick-up is of conventional form and consists of a shell 3 in which is mounted a pick-up cartridge of any suitable kind. The arm 1 is provided with a lining 4 of fibrous or plastic damping material throughout its length.

The arm 1 is secured, at its rear, to a ring 5 which is provided on its other side with a second arm 6 upon which is mounted a counterbalance weight 7, the second arm 6 being disposed co-axially with the pick-up carrying arm 1. The counterbalance weight 7 consists of an inner balance weight 8 which is made a sliding fit on the arm 6 with rubber washers 9, and an outer balance weight 10 in screw-threaded engagement with the inner weight 8.

This ring 5 is pivoted on each side at 11 to the sides of a balance member 12 by means of spring-loaded conical or V sapphire bearings so that the arms 1 and 6, balance weight 7, and ring 5 may be in unison about a horizontal axis.

In use, the balance weight 7 is slid on the arm 6 until the whole assembly including the pick-up is balanced, i.e., to achieve zero playing weight, and then the outer weight 10 is rotated so as to be moved axially inwards in relation to the inner weight 8 until the desired playing weight is obtained as indicated on the scale 8*a*.

The balance member 12 is supported on a plunger 13 tapered at its upper end 14 to a point which engages in the conical socket of a sapphire bearing 15 so that the balance member 12 is universally pivoted on the plunger 13, the member 12 extending downwardly from the pivot and surrounding the plunger 13. The center of gravity of the balance member 12 is arranged to lie below the universal pivot, and the lower portion of the balance member 12 is enlarged so as to increase its mass. The universal pivot is located so as to lie above the horizontal plane containing the horizontal axis defined by the pivots 11. In this way the horizontal axis defined by the pivots 11 is virtually in parallel with the rocking axis of the universal pivot so that the total bearing friction for pivoting of the arm about a horizontal axis is less than that of either one taken alone. In addition, any pull or push along the arm will be transmitted via the bearings at 11 so as to tilt the balance member 12 about the pivot at 15. The mass of the balance member 12 will then be displaced from a position exactly beneath the universal pivot 15 and gravity will exert a torque on the balance member which will balance the displacing force.

The balance member 12 is provided with a cap 16 of plastic material which serves to cover a spirit level 17 which is located in the top of the balance member 12.

The plunger 13 is fitted in a sleeve 18 which in turn is arranged to be clamped to a base plate 19 by means of a threaded locking nut 20. The base plate 19 is adapted to be mounted upon the supporting member 2 and the height of the arm above the supporting member can be adjusted by loosening the nut 20, and sliding the sleeve 18 vertically in the base plate 19.

The plunger 13 is arranged to be a sliding fit in the sleeve 18, and a quantity of oil or grease 21 is inserted beneath the end of the sleeve. By virtue of this sliding fit between plunger and sleeve and the sealing rings 22 on the plunger, the plunger 13 is resiliently supported by the oil or grease and by any air that may be trapped with it beneath the plunger.

In order to increase the sealing effect, the grease in the rings 22 may be arranged to be of a material impervious to the oil or grease used elsewhere in the sleeve.

In order to be able to remove the plunger 13 from the sleeve 18 and to replace it, a hole 23 is provided at the end of the sleeve, the hole 23 being normally blocked by means of a rod 24 having a threaded portion. The rod 24 may thus be removed easily for removal or fitting of the plunger.

To provide further damping, and to increase the resilient support of the plunger, the rod 23 is extended up into a bore 25 in the plunger 13 and supports a ball 26 provided in this bore 25 to provide a seal.

In this way the transmission of vibrations from the supporting member 2 to the arm is effectively damped by the hydraulic or pneumatic suspension (or both) of the plunger 13 in the sleeve 18.

Since the plunger 13 can rotate in the sleeve 18, a second vertical pivot is provided in parallel with that afforded by the universal pivot so that the total bearing friction for pivoting of the arm about a vertical axis is less than that of either one taken alone.

In order to locate the pick-up at an off-set angle, and thereby reduce tracking errors, the arm 1 is bent as at 1*a*, which causes the centre of gravity of the arm to lie to one side. In order to counteract this effect a counterbalance 27 is provided on the lower part of the balance member 12.

A manually operated cueing device, shown generally as 28, is provided on the base plate 19 for lifting the arm and for lowering it onto a record at any selected position. This also is adjustable for height to allow for the height adjustment provided for the arm.

It will be appreciated that, with the construction herein described, during playing any pull on the arm in a longitudinal direction caused by the drag of the record groove on the stylus, and any changes in this pull, or any side thrust or change of side thrust of the record groove on the stylus will be compensated by rocking of the balance member 12 upon its universal pivot.

I claim:

1. A phonograph pick-up arm assembly comprising, in combination, a relatively massive balance member; means pivotally supporting said balance member for universal lateral swinging movement with its center of gravity normally substantially directly below its pivotal support; a relatively elongated pick-up arm; means connecting said pick-up arm in balancing relation to said balance member for pivotal movement relative thereto about an axis which is disposed normally horizontal in use and which is substantially directly below such pivotal support; said supporting means comprising a generally upright post having a pivot for said balance member at its upper end; said balance member extending downwardly from its pivotal support and surrounding, and being spaced laterally from, said post; a sleeve telescopically receiving said post and having a closed inner end spaced from the inner end of said post; and fluid within said sleeve between the closed inner end thereof and the inner end of said post and spacing the closed inner end of said sleeve from the inner end of said post; the closed inner end of said sleeve being formed with an aperture closed by a removable plug to permit the removal and insertion of said post in said sleeve.

2. A phonograph pick-up arm assembly comprising, in combination, a relatively massive balance member; a generally upstanding post engaging at its upper end the said balance member and supporting it for universal swinging movement on the post, said balance member extending downwardly from its pivotal support and surrounding, and being spaced laterally from, said post, the center of gravity of said balance member being normally substantially directly below its pivotal support; a sleeve telescopically receiving the lower end of said post, said sleeve having a closed lower end spaced from the lower end of said post; fluid located within said sleeve between the closed lower end thereof and the lower end of said post, whereby said post and said balance member are supported only by said fluid; a relatively elongated pick-up arm; a pick-up carried at one end of said arm and located at an off-set angle with respect thereto; and means connecting said pick-up arm in balancing relation to said balance member for pivotal movement relative thereto about an axis which is disposed normally horizontally in use and which is located at a spaced distance substantially directly below said pivotal support.

References Cited in the file of this patent

UNITED STATES PATENTS

| | | |
|---|---|---|
| 2,974,961 | Goldmark | Mar. 14, 1961 |
| 2,993,698 | Stanton | July 25, 1961 |
| 3,051,494 | Walton | Aug. 28, 1962 |

FOREIGN PATENTS

| | | |
|---|---|---|
| 618,814 | Great Britain | Feb. 28, 1949 |